INVENTOR.
KNUT HENRICHSEN
BY Charles F. Dischler
ATTORNEY

April 30, 1963 K. HENRICHSEN 3,087,437
HIGH TEMPERATURE VARIABLE DISPLACEMENT PUMP
Filed Oct. 12, 1959 3 Sheets-Sheet 2

INVENTOR.
KNUT HENRICHSEN
BY
Charles F. Dischler
ATTORNEY

April 30, 1963 K. HENRICHSEN 3,087,437
HIGH TEMPERATURE VARIABLE DISPLACEMENT PUMP
Filed Oct. 12, 1959 3 Sheets-Sheet 3

*INVENTOR.*
KNUT HENRICHSEN
BY
Charles F. Dischler
ATTORNEY

United States Patent Office 3,087,437
Patented Apr. 30, 1963

3,087,437
HIGH TEMPERATURE VARIABLE DISPLACEMENT PUMP
Knut Henrichsen, Los Angeles, Calif., assignor to North American Aviation, Inc.
Filed Oct. 12, 1959, Ser. No. 845,671
10 Claims. (Cl. 103—161)

This application is a continuation-in-part of my copending application Serial No. 733,408, now Patent No. 3,051,194 issued August 28, 1962.

This application relates to pumps of the variable volume type and more particularly it relates to a variable stroke radial pump for operation in high temperature environments and under liquid pressures of the order of thousands of pounds per square inch.

Constant pressure variable volume radial cylinder pumps have long found extensive use in aircraft hydraulic systems. With the advent of supersonic aircraft the demands made upon such pumps have very greatly increased. With the more advanced supersonic and even hypersonic aircraft now being designed, the required pump characteristics have become even more exacting and difficult of attainment. Not only are greater pressures and volumes required in order to hydraulically operate the aircraft control surfaces at such high speeds, but the temperature problem also assumes major importance. For instance, pumps in one design classification are now required to operate at pressures as high as 4,000 pounds per square inch and with fluid inlet temperatures of the order of 400° F.

The design problems attendant upon high pressures are relatively well known and their solution susceptible of standard engineering design analyses. But the problems encountered in producing a small lightweight pump for continuous high temperature aircraft usage require unique solutions. Among the detrimental effects of such high temperatures may be an increase in leakage or the possibility of binding due to differential expansion of mating parts. Additionally, the high temperatures that are an unavoidable result of the severe conditions of such high speed flight alter the characteristics of the pump components as well as the control valves associated with such pumps thereby causing variations in the pump output pressure characteristics with an increase in temperature.

Variations in pump stroke and hence in pump volume displacement of a radial piston rotary type pump are normally accomplished by varying the eccentricity of a reaction ring or piston slipper race, which encircles and contains the pistons, relative to the axis of rotation of the cylinder block and thereby effects piston reciprocation. In general, this reaction ring is moved to an eccentric position by some form of mechanical controlling means in opposition to which fluid pressure produced in the pump cylinders acts to reduce the eccentricity of the reaction ring, thereby reducing the effective stroke of the pistons and the pump output. In general, reaction rings known in the prior art have either been pivotally mounted or adapted to slide on trackways with the eccentricity being controlled by either leaf and coil springs or pressure loaded pistons. Such control devices fail to provide sufficiently fast response for many applications wherein fluctuations are particularly evident such as in installations where sudden large volume demands may be made on the pump. Furthermore, such prior types of eccentricity controlling means normally require the full pump discharge pressure or a substantial portion thereof for their operation. It is because of limitations such as these that such pumps are not able to respond with sufficient rapidity to prevent pressure fluctuations in the discharge when a sudden demand is made on the pump.

To overcome these disadvantages, the present invention provides an eccentric reaction ring or piston slipper race that is fully floating but guided for a rolling motion within the pump casing whereby the reaction ring may be translated from a position of maximum eccentricity to a position concentric with the cylinder block and pistons for zero pump displacement. In my invention, the reaction ring is translatable within the pump casing by a differential low pressure acting over substantially the entire surface area of the diametrically opposite halves of the floating reaction ring. Sealing means contact the casing and reaction ring to form therewith opposed variable volume chambers of which one chamber will contract an amount proportionate to the expansion of the other chamber when the reaction ring is moved in the casing under the applied pressure differential. A portion of the sealing means serves as a thrust block to transmit the high piston forces to the casing and also provides a small planar surface upon which the reaction ring rolls during its translatory movement from a concentric to an eccentric position and return. To achieve the required pressure differential for actuating the piston reaction ring a low constant fluid pressure is communicated to one of the variable volume chambers, while a variable pressure, dependent on the discharge pressure, is communicated to the other opposed chamber on the opposite side of the reaction ring. This pressure differential acts to feather or unfeather the variable displacement reaction ring, depending on whether the variable pressure is greater than or less than the constant applied pressure.

Accordingly, it is an object of this invention to provide a pump that is particularly suitable for use in aircraft by reason of its extremely small envelope dimensions, its light weight, simplified design and the minimum of hardware items incorporated therein.

The pump of this invention operates at a design speed of 8,000 revolutions per minute, or higher, while producing a large volume flow rate at 4,000 pounds per square inch discharge pressure and inlet temperatures of about 400° F. Its straightforward design has resulted in a reduction to a total of no more than one-hundred twenty-seven component parts, of which but a relatively few are moving parts, to thereby insure ease of assembly and disassembly, great reliability, as well as economy in production.

It is also an object of this invention to provide a pump having extremely fast feathering and unfeathering speeds. The rapidity with which the displacement of this pump may be varied is so great that in some installations the use of hydraulic pressure accumulators may be obviated.

It is still another object to provide a pump having a piston stroke controlling device that is not directly dependent on the action of springs or auxiliary pistons, wherein such controlling device is substantially instantaneously operable by pressures that are but a small fraction of the pump discharge pressure.

It is a further object to provide a piston reaction ring structure for controlling pump displacement that is freely floating and immersed in fluid to reduce to a minimum any oscillations induced by the moving piston load resultant force. Oscillation of the reaction ring due to piston loads is significantly reduced because the ring is immersed in a minimum volume of fluid within the pump casing, which, since the piston load is transmitted to the fluid by the relatively large surface area of the reaction ring, thereby subjects the immersing fluid to only low pressure fluctuations so that fluid compression is negligible. Viscous damping is not of significant importance in this damping action since viscous damping exists only when there is motion; and here the oscillatory motion is reduced in the first instance to an insignificant amount by the built-in structural features of the pump.

Yet a further object of this invention is the provision of a reaction ring that is translatable from an eccentric to a concentric position by rolling on the substantially planar face of a bearing sealing member, which transmits the high piston loads to the pump case.

A still further object is the provision of a reaction ring, or slipper race, that requires no predetermined or particular position in the assembly of the pump, but which will position itself in an optimum operating position upon rotation of the pump. Over a period of time with numerous dismantlings and reassemblies of the pump, this self-positioning feature of the reaction ring will cause uniform wear and preclude an excessive amount of wear at any particular area on the ring thereby prolonging the useful life of the reaction ring.

These and other objects and advantages of the present invention will become apparent to those skilled in the art after reading the present specification and the accompanying drawings forming a part thereof, in which.

Figure 1:
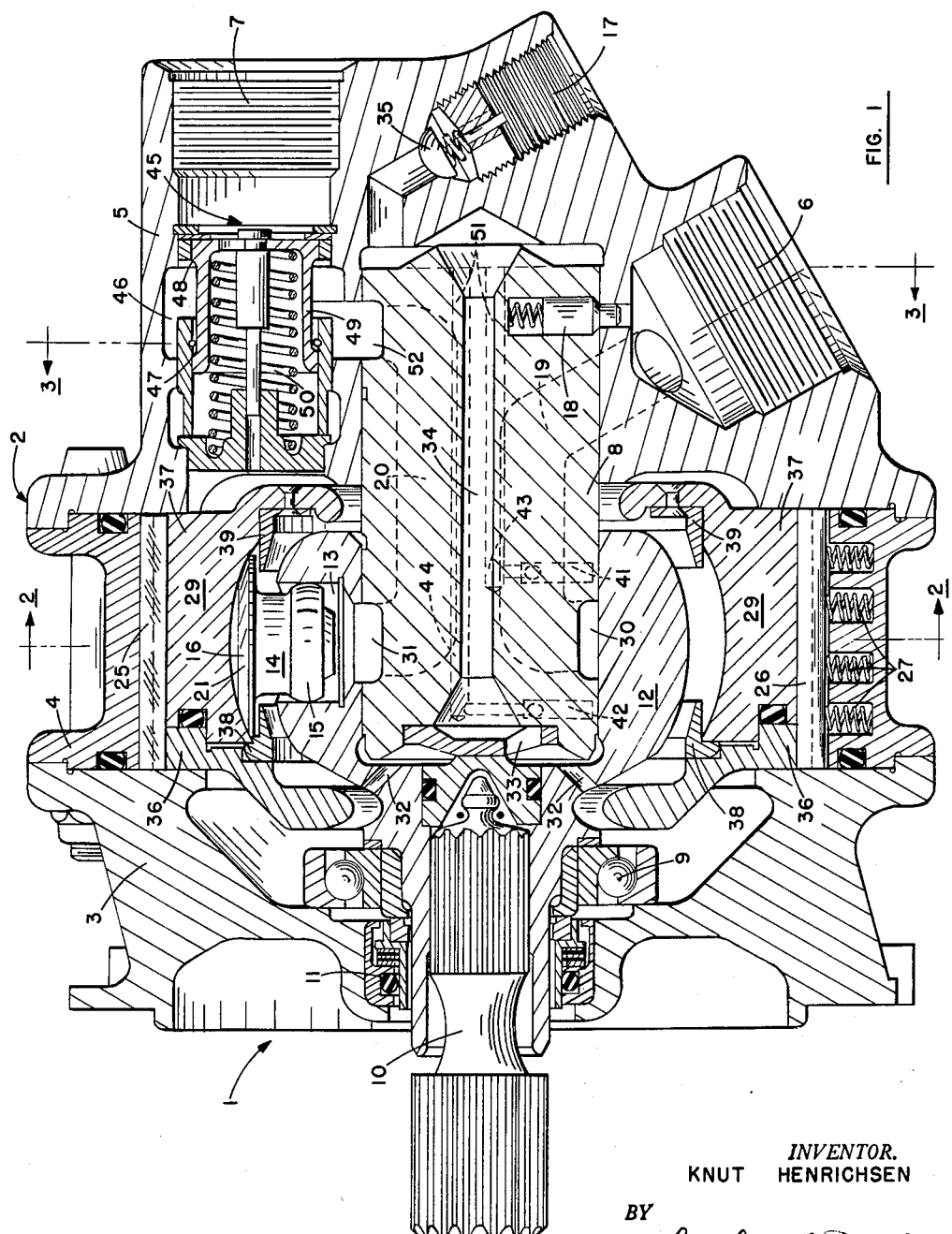
FIG. 1 is a longitudinal sectional view of the variable displacement pump of this invention taken in a medial plane thereof.
Figure 2:
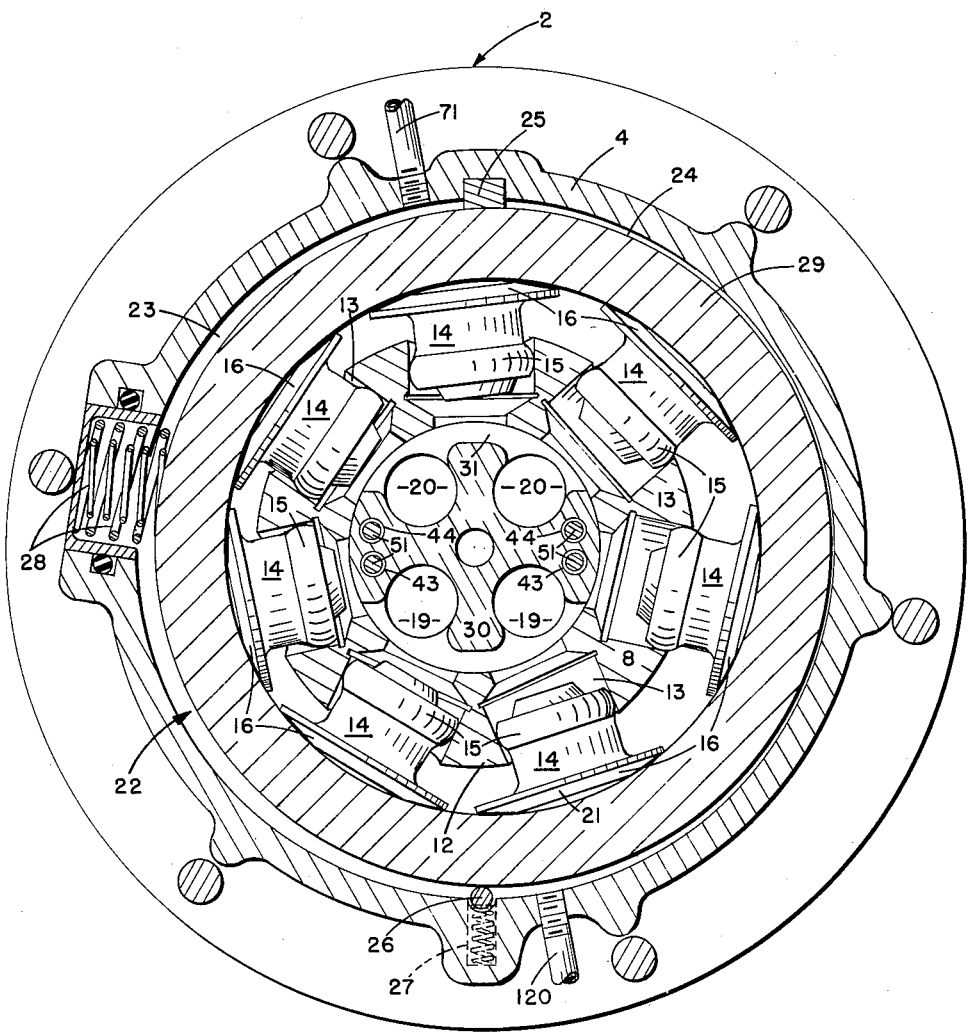
FIG. 2 is a transverse sectional view taken in the plane of line 2—2 in FIG. 1 and showing the floating slipper race in a position of maximum eccentricity.
Figure 3:
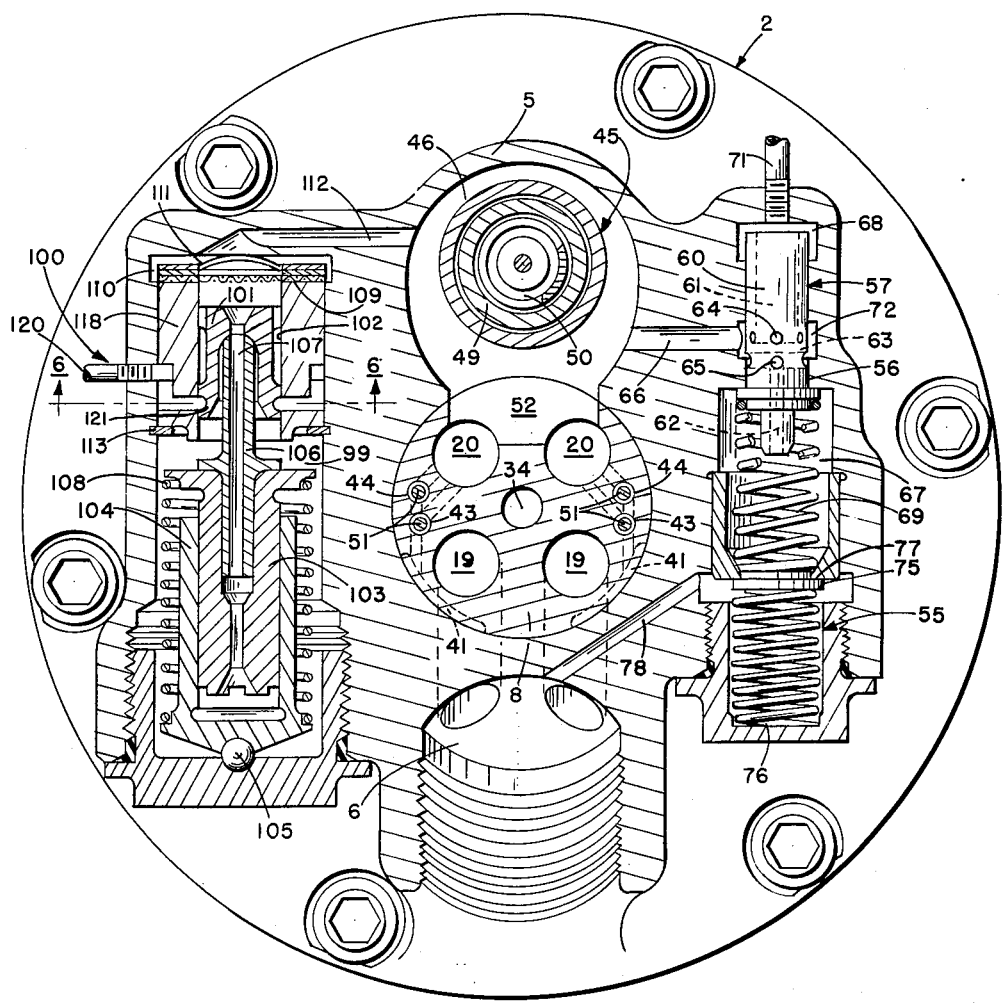
FIG. 3 is a transverse sectional view taken in the plane of line 3—3 in FIG. 1 showing the constant pressure valve and a governor valve for controlling the eccentricity of the reaction ring slipper race in accordance with the pump demand. The built-in purge valve and case drain bypass valve are also clearly illustrated by this figure.

Referring specifically to the drawings wherein like reference characters have been used throughout the several views to designate like parts and referring at first to FIGS. 1, 2 and 3, reference numeral 1 generally designates a hydraulic device having a casing 2 consisting of a drive end section 3, a center annular section 4 and a discharge end section 5 removably joined together in a conventional manner by through-bolts. Discharge casing section 5 has a fluid inlet port 6, fluid outlet port 7 and a casing fluid outlet port 17 extending therethrough for communication with appropriate complementary passageways in pintle valve 8, which is removably mounted in the casing section 5 by means of a spring-loaded detent 18. The pintle valve includes openings 19 and 20 which serve as the inlet and outlet passageways, respectively, communicating with the respective inlet and outlet ports 6 and 7. The pintle valve acts as the main bearing for the pump, rotatably supporting the cylinder block 12 thereon, while antifriction bearing 9 serves to axially support the cylinder block where splined power input shaft 10 mates with interior splines in the cylinder block for driving the same. A shaft seal 11 prevents leakage of case fluid from the "wet case" of the pump.

Figure 4:
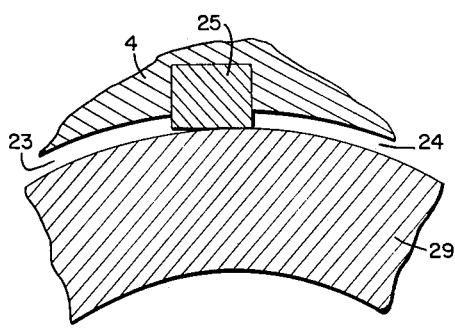
FIG. 4 is an enlarged view of a fragmentary portion of the transverse sectional view of FIG. 2 showing, in detail, the contact relationship of the reaction ring and the planar surfaced thrust block bearing member.

The cylinder block 12 is provided with a plurality of radial cylinders 13, in which piston slipper assemblies 14 reciprocate. These piston slipper assemblies are preferably of the type disclosed in my copending application Serial No. 682,981 and are so shown and described herein. Each of these assemblies includes a piston portion 15 for reciprocation within a cylinder and a slipper portion 16 projecting beyond the cylinder block and having a spherical outer face, with a fluid basin therein, which engages a complementary spherical slipper bearing race or reaction ring 29. For ease of manufacture and to make assembly possible, ring 29 is made in two parts, members 36 and 37, which are assembled in a manner to position and hold piston return rings 38 and 39. The reaction ring or slipper bearing race is floatingly mounted within casing annulus 4 between the opposed ends of casing sections 3 and 5. The slipper bearing race in conjunction with the casing sections thus forms a chamber 22. As best seen in FIG. 2 and FIG. 4, this chamber is divided substantially on a diameter of the reaction ring into oppositely disposed chambers 23 and 24 by a bearing member 25 extending between the flange spaces of casing sections 3 and 5 and which includes a substantially planar face on which reaction ring 22 may roll. Diametrically opposite the bearing member, a linear seal 26 is biased into contact with the reaction ring by springs 27. With this arrangement, by the application of a suitable pressure differential across the reaction ring, the ring may be positioned anywhere within the range of ring movement from the limit of a "bottomed" position at the extreme right of the casing to a "bottomed" position at the extreme left of the casing. As shown in this figure, when the pressure in chamber 23 sufficiently exceeds the pressure in chamber 24, the slipper race or reaction ring is at the extreme right and the race has its maximum eccentricity with respect to the center of rotation of the cylinder block and the displacement of the pump is a maximum. Conversely, when the pressure in chamber 24 is sufficiently greater than the pressure in chamber 23, the reaction ring will be biased to the extreme left against the casing thereby bringing the axis of the ring and the cylinder block into coincidence whereby the pump pistons have a zero displacement and the pump rotates without pumping any fluid.

Springs 28 provide a positive initial eccentricity for start-up. Without such an initial eccentric biasing force, the reaction ring and cylinder block might remain in a concentric relationship. These relatively light biasing springs, however, provide sufficient initial eccentricity so that the pump is able to operate satisfactorily and within a very few revolutions of the cylinder block the pressure has risen to a point sufficient to permit hydraulic control of the reaction ring.

Numerous advantages result from the present floating type mounting of the slipper race wherein the race ring is immersed in fluid and guided for rolling movement on the planar surface of bearing member 25 as the pressure differential across the race varies to translate the race through its full range of eccentricity. Prior radial pump reaction rings have normally been of the sliding or pivoted type which have been actuated by pressure loaded pistons or springs. These pistons are of a small cross-sectional area and require the application thereto of substantially the full discharge pressure of the pump for operation. Therefore, the response of such piston operated bearing race rings is slow and inadequate since it requires substantially the full outlet pressure of the pump to be first developed before they can become operative. One of the prime advantages of the unique immersed floating slipper race of the present invention is that only a fraction of the discharge pressure is necessary for effecting unfeathering. By requiring but a small constant pressure force, preferably 150 to 200 pounds per square inch, applied to chamber 23 and acting over the full diameter on one side of the race to bias it to maximum eccentricity, the pump acts almost instantaneously, in response to a sudden demand for increased output flow, to unfeather and pump at full capacity under fully automatic control by means of a metered hydraulic pressure differential. This pressure differential, of course, results from the small constant pressure acting on one side of the slipper race and the variable pressure, which is dependent on the pump discharge pressure, acting on the other side of the race in chamber 24 and communicated thereto by governor 100.

Perhaps the foremost advantage and most unique feature of this arrangement is the rapid unfeathering and response to a suddenly increased output demand that can now be achieved with a pump of the radial type. For a pump designed in accordance with this invention having a gross output of 26.9 g.p.m. at 8,000 r.p.m. with a fluid inlet temperature of 400° F., the slipper race will unfeather from a position effecting 10% piston stroke to a position of 100% piston stroke, i.e., maximum eccentricity, in less than 1/60 of a second. This results in only a mere two cubic inch less output volume than if such unfeathering had been instantaneous. In some installations, this extremely fast response may obviate the use of accumulators. The rolling action of the reaction ring on the bearing block serves to reduce the friction that must be overcome to move the reaction ring and further assists in providing the unique speed of response that is a characteristic of this pump.

As set forth in my copending application, Serial No. 682,981, a large resultant piston load is caused by the compression of the fluid in the piston cylinders. The resultant piston load of such pumps oscillates about a center line. This oscillating force tends to move the ring back and forth in the direction of eccentricity. As previously described, however, the immersion of the slipper reaction ring in the manner of this invention serves to reduce such oscillatory motion to a minimum.

Another unique feature of the present reaction ring arrangement is that it may be assembled in the pump in any circumferential position relative to the casing. There is no need to provide match marks that must be aligned for best operation. The ring is free to assume any orientation upon operation of the pump. This also means that the race ring will wear more evenly and last longer since portions assuming the maximum loads may be rotated to alternate different areas of the ring for maximum load assumption.

Referring to FIGS. 1 and 2, pintle inlet and outlet passageways 19 and 20 connect the casing inlet and outlet ports 6 and 7 with the diametrically opposed pintle inlet and outlet ports 30 and 31, respectively. The latter extend circumferentially around portions of the lower side and the upper side of the pintle, respectively. Ports 30 and 31 are dimensioned to correspond to the diameter of the cylinder ports for cooperation therewith in the fluid pumping process. With the embodiment as shown in FIG. 2, the cylinder block rotates counterclockwise, thereby drawing fluid from inlet port 6 through passageway 19, thence into pintle inlet port 30 and from there into the cylinders on the lower half of the pintle valve. Pistons on the upper portion of the pintle valve move inwardly and force the fluid into port 31, through passage 20 and outlet port 7.

All leakage within the pump eventually flows into the case, building up enough pressure to force the leakage fluid back to the reservoir through axial return passage 34 in the pintle. The fluid will release some air into the case 2, and since a wet case is not only permissible but also necessary for slipper operation during the intake stroke, this air must be expelled. Leakage fluid in the pump case thus passes through ports 32 and 33 to central axial passage 34, which may be connected to the reservoir return line of a closed hydraulic system by means of case outlet port 17 which is provided with a check valve 35 to prevent return flow into the case. The case outlet is also connected to the inlet port 6 by means of a bypass valve 55 to be described hereafter. The axial location of pintle leakage fluid passage 34 assures that any air in the case will be immediately exhausted as the pump rotates and the denser hydraulic fluid is forced outwardly under the action of "centrifugal force."

The pump of this invention incorporates the fluid balancing features shown in my copending application Serial No. 843,495. By the unique arrangement set forth therein, a predeterminately designed overbalancing force tending to urge the lower surfaces of the cylinder block and pintle into contact is balanced by a metered flow of high pressure fluid to the region between the lower surfaces of the cylinder block and pintle on either side of the inlet port 30. By this structural arrangement, both radial eccentricity and axial tilting misalignment of the cylinder block and pintle is prevented.

The structure for overcoming the pintle over-balance, and thereby insuring that a fluid film is maintained between the pintle and cylinder block at all times, is shown in FIGS. 1 and 2. The arrangement includes a pair of balance grooves 41 provided on the lower surface of the pintle between inlet port 30 and one end of the pintle. A similar pair of balance grooves 42 is located on the other side of inlet port 30. Conduits 43 and 44 interconnect high pressure outlet passages 20 with the balance grooves 41 and 42, respectively. The conduits are provided with suitable restrictions, such as metering pins 51, which hold the flow to a predetermined value depending upon the clearance in the conduits. Thus, this arrangement provides a controlled high pressure fluid force acting on the low pressure bottom area of the pintle that is sufficient to overcome the predeterminately designed and built-in over-balance on the top of the pintle to assure the maintenance of a lubricating fluid film between the cylinder block and pintle. A more detailed description of the action of this fluid balancing arrangement is provided in my above-mentioned copending application. While the present embodiment is described herein as being of the over-balanced type, it could equally well be of the under-balanced type as taught in my copending application Serial No. 843,495 and, further, it could also incorporate a modified metering and pressure balancing groove arrangement of the type disclosed therein whereby the metering pins 51 may be eliminated.

As previously stated, the piston slipper assemblies 14 of the present pump are of the same unique construction described in my copending application Serial No. 682,-981. In this arrangement, the piston portion 15 has an exterior segmental spherical surface, which allows the piston to float freely and assume an angular position within the cylinder as the cylinder block rotates and the piston slipper is displaced from the axis of the cylinder by the fluid forces acting thereon. The spherical contours of the piston slipper face 21 and the bearing race, or reaction ring 29, assure that no misalignment will occur therebetween. The piston slipper assembly includes a restricted passageway therethrough whereby high pressure fluid from the interior of the piston cylinder may be applied to a basin formed in the face of the slipper to provide step bearing lubrication in the manner described in detail in my co-pending application. On the intake stroke and at high speeds of rotation a check valve in the piston slipper assembly prevents any reverse flow from the basin located in the slipper. Under this condition of operation, the slipper of this pump operates as a dynamic fluid wedge bearing for preventing metal-to-metal contact with the slipper race.

To assure positive outward displacement of the piston slippers during the intake stroke at low speeds, piston return rings 38 and 39 are provided to guide and positively move the piston slippers outwardly on the suction stroke. These rings are only effective at low speeds when the centrifugal force may be insufficient to return the pistons to the outer end of the cylinder against the case fluid pressure.

To assure a quick build-up of pressure within the pump for supplying pressurized fluid to the fluid balancing grooves, a priority valve 45 serves to prevent any discharge from the pump below a preset pressure which, in a typical application may be a pressure of about 2,000 pounds per square inch. Annular chamber 46 in casing end section 5 provides communication with the pintle outlet passage 20 to allow application of the pump discharge pressure to the priority valve. Annular shoulder 47 on the priority valve sleeve 49 has a larger area than shoulder 48 at the opposite end of the sleeve. Upon pump start-up, when the differential force applied to the sleeve by the discharge pressure is sufficient to overcome valve spring 50, the priority valve will open, allowing fluid to be discharged to outlet port 7.

Reference is now made to FIG. 3 for a description of the valve structure for controlling the eccentricity of the piston slipper reaction ring 29. This figure of the drawing also illustrates the purge valve 56 and bypass valve 55 utilized in this pump. Valve body 60 comprises the movable valve member for both purge valve 56 and a constant pressure valve 57. This combined valve body has axial bores 61 and 62 separated by an imperforate wall 63 with ports 64 and 65 connecting bores 61 and 62, respectively, with an annular chamber 72 that communicates by passage 66 with the priority valve chamber 46. Upon pump start-up, the air in the pump is expelled from chamber 46 through passageway 66, annular chamber 72, port 65 and bore 62 into a chamber 67 which communicates by a passage (not shown) to the case outlet port 17. As the air is expelled from the pump, fluid flows through passage 66, port 64 and bore 61 into chamber 68 above valve body 60. When the pressure acting on the valve body 60 is sufficient to overcome the biasing force of spring 69, the purge valve is closed by the valve body 60 being forced downwardly until ports 65 are no longer in registry with the annular chamber 72 surrounding the valve body. Thus, the purge valve serves to expel the air in the pump ahead of the pumped fluid and as soon as the air has been exhausted and fluid is fed to the valve above a predetermined rate of flow it closes. The built-in priority valve in the outlet port is biased to closure by spring 50 upon start-up and thus almost instantly the pressure within the pump is raised to the priority valve opening threshold level, here preferably 2,000 pounds per square inch. This pressure then activates the slipper step bearing and the pintle valve balance grooves.

Constant pressure valve 57 thus consists of spring biased valve body 60 which has ports 64 connecting passage 66 with axial bore 61 to permit application of the pump pressure to the upper surfaces of the valve body. Spring 69 preferably has a spring constant permitting maintaining a constant pressure in chamber 68 of about 150 pounds per square inch for a 3,000 p.s.i. pump output pressure and 200 p.s.i. for 4,000 p.s.i. pump output pressure. This constant pressure is transmitted through conduit 71 to reaction ring chamber 23 for controlling the ring eccentricity in conjunction with the governor valve 100.

A spring-loaded bypass valve 55 is arranged to open and permit communication between the case 2 and the pump inlet 6 when the case pressure exceeds the inlet pressure by a small pressure differential, preferably 10 pounds per square inch. Bypass valve 55 comprises a valve body 75 biased to closure on valve seat 77 by spring 76. When the case pressure in chamber 67 is sufficient to overcome the biasing force of spring 76, the valve will open permitting flow from the case to the inlet port 6 by means of passage 78. This arrangement limits the pump case pressure that would tend to counteract the piston return by centrifugal force and it also limits the pressure on shaft seal 11. Normally this valve will be inoperative. However, it may become operative if abnormal conditions exist, such as during low temperature starting when the case return line may be congested by very low temperature fluid of high viscosity. Conversely, if the intake line becomes congested while the return flow is unobstructed, the pressure drop from the reservoir to the pump may exceed 10 pounds per square inch and when the bypass valve opens the case pressure could drop below reservoir pressure thereby causing reversal of flow in the case fluid return line. Check valve 35 in the case fluid return line prevents this flow reversal which would be undesirable in the event the case return line terminates in an air filled portion of the reservoir.

Governor 100, as described herein, is of the temperature compensated type described in my copending application Serial No. 733,408. As shown in FIG. 3, a steel piston 101 is axially displaceable within a piston chamber 102 formed in steel cylinder body 118, which is mounted within a cylindrical chamber 99 by means of a retainer ring 113. Piston 101 herein acts as a valve member with valve lobe 121 movable in accordance with the pump discharge pressure, which is applied through an inlet passage 112, to provide a variable pressure to chamber 24 with which it is operatively connected by conduit 120. An aluminum cylinder 104 is pivotally mounted on a ball 105 at the lower end of governor chamber 99 for automatic alignment with upper piston 101. An aluminum piston 103 is slidably mounted within aluminum cylinder 104 and is interconnected with piston 101 by means of a rigid spacer member 106 with a spring 108 biasing the piston assembly in opposition to the net pressure force applied to the two opposed pistons. Steel piston 101, the interconnecting member 106 and the aluminum piston 103, all have a connecting axial bore therein forming a passage 107 to allow communication of the high pressure fluid introduced through passageway 112 to act on the lower surface of piston 103, as well as on the upper surface of piston 101. The respective diameters of the aluminum piston 103 and steel piston 101 are proportioned relative to the spring modulus of elasticity in the manner outlined in my copending application Serial No. 733,408. To prevent the introduction into the governor of foreign solid particles of excessive size that may be carried in the hydraulic fluid, a screen 109 is positioned at the inlet to the cylinder 102. This is held in place by means of washer 110 and a Marcel spring 111.

It will be seen that return flow from chamber 24 as the reaction ring is biased to maximum eccentricity communicates with the pump casing return line by means of governor chamber 99 which is connected to the case return line by a conduit not shown. Similarly, it will be evident from the description of the constant pressure valve 57 that when the reaction ring is moved toward a concentric position by means of a high variable pressure from the governor in response to a lessening in pump demand, relief of the constant pressure from chamber 23 will result from downward movement of valve body 60 against biasing spring 69 whence the excess fluid in chamber 23 may flow into spring chamber 67 which similarly connects with the case return line by a conduit that is not shown on the drawing.

While a particular embodiment of this invention has been illustrated and described herein, it will be apparent that various changes and modifications may be made in the construction and arrangement of the various parts without departing from the spirit and scope of this invention in its broader aspects, or as defined in the following claims.

I claim:

1. A hydraulic device of the radial piston, variable displacement type comprising a casing having inlet and outlet ports; a rotary cylinder block having radial cylinder chambers rotatably mounted in said casing; piston means reciprocable in the chambers of said cylinder block; valve means providing sequential communication between said cylinder chambers and said inlet and outlet ports as the cylinder block is rotated; a reaction ring within said casing whereby reciprocation of the pistons may be effected when said reaction ring is eccentrically positioned relative to the cylinder block upon rotation of the same, said reaction ring being operatively contacted by said piston means and being continuously eccentrically adjustable relative to said cylinder block to vary the displacement of the piston means; means mounting said reaction ring for sealingly guided free-floating straight line rolling motion within said casing, said mounting means contacting said reaction ring and said casing and forming therewith an opposed piston and piston chamber assembly; means communicating a substantially constant pressure fluid to one end of said piston chamber assembly; and means communicating a variable fluid pressure that is proportional to the discharge pressure to the other end of said piston chamber to provide a pressure differential across the reaction ring to thereby displace the same relative to said casing and said cylinder block.

2. A hydraulic device of the radial piston, variable displacement type as set forth in claim 1 and further including means in one end of said piston chamber assembly initially biasing said reaction ring to an eccentric position relative to said cylinder block, said biasing means only being effective during initial start-up of the device.

3. A hydraulic device of the radial piston, variable displacement type comprising a casing having inlet and outlet ports; a rotary cylinder block having radial cylinder chambers rotatably mounted in said casing; piston means reciprocable in the chambers of said cylinder block; valve means providing sequential communication between said cylinder chambers and said inlet and outlet ports as the cylinder block is rotated; a cylindrical reaction ring mounted for floating movement within said casing whereby reciprocation of the pistons may be effected when said reaction ring is eccentrically positioned relative to the cylinder block upon rotation of the same, said reaction ring being operatively contacted by said piston means and being continuously eccentrically adjustable relative to said cylinder block to vary the displacement of the piston means; diametrically opposed means in said casing sealingly contacting said reaction ring and forming with said casing and reaction ring opposed fluid receiving chambers; one of said opposed sealing means providing a surface adapted to permit rolling contact of the cylindrical reaction ring thereon; means communicating a substantially constant pressure fluid to one of said fluid receiving chambers; and means communicating a variable fluid pressure that is proportional to the discharge pressure to the other of said fluid chambers to provide a pressure differential across the reaction ring to thereby displace the same relative to said casing and said cylinder block.

4. A hydraulic device of the variable displacement type comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; cylindrical reaction ring means within said casing for cooperation with said piston means, said reaction ring being operatively contacted by said piston means and being continuously eccentrically adjustable relative to said cylinder block to vary the displacement of the piston means; means mounting said reaction ring for rectilinear rolling movement within said casing and forming in cooperation with said reaction ring and casing opposed fluid receiving chambers; said mounting means including a fixed member sealingly contacting one side of said casing and said reaction ring and further including a radially movable member sealingly contacting the opposite side of the casing and reaction ring; means supplying substantially constant fluid pressure to one of said fluid receiving chambers; and a means communicating a variable fluid pressure to the other of said chambers to provide a pressure differential across the reaction ring to thereby displace the same relative to said piston means.

5. A variable volume hydraulic assembly for operation in a high temperature environment comprising a casing having an inlet and an outlet port; a cylinder block rotatably mounted in said casing and having cylinder chambers therein; piston means reciprocable in the chambers of said cylinder block; pintle valve means providing sequential communication between said cylinder chambers and said inlet and outlet ports as the cylinder block is rotated; a fully floating cylindrical slipper race within said housing that may be progressively eccentrically displaced relative to the cylinder block for effecting reciprocation of the pistons and varying the displacement of the piston means; means contacting said slipper race and said casing and forming therewith opposed chambers while mounting said slipper race for rolling movement into and out of said chambers; said contacting means including a fixed member having a substantially planar face permitting said slipper race to roll thereon and further including a resilient member sealingly contacting the opposite side of said casing and said slipper race; means communicating with said outlet port to supply substantially constant pressure fluid to one of said fluid receiving chambers at a pressure substantially less than the discharge pressure; and means communicating a variable fluid pressure to said other chamber that is substantially proportional to the discharge pressure, thereby providing a pressure differential across the slipper race whereby the same is eccentrically displaced relative to said casing and said cylinder block and reciprocation of the pistons affected.

6. A variable volume hydraulic device, as set forth in claim 5, wherein said fixed member comprises a linear longitudinally extending bearing member disposed partially within said casing providing a seal between said casing and said floating slipper race.

7. A variable volume hydraulic device, as set forth in claim 5, wherein said resilient member comprises a linear seal member spring biased radially inwardly into contact with said slipper race.

8. A variable volume hydraulic device, as set forth in claim 5, wherein said fixed member comprises a linear bearing member disposed partially within a first longitudinally extending slot in said casing and providing a seal between the casing and the floating slipper race, and wherein said resilient member comprises a cylindrical linear seal disposed partially within a second longitudinally extending slot in said casing and spring biased radially outwardly therefrom into sealing engagement with said slipper race, said first and second casing slots being oppositely disposed.

9. A variable volume hydraulic device, as set forth in claim 5, and further including means in one of said fluid receiving chambers initially biasing said reaction ring to an eccentric position relative to said cylinder block, said biasing means controlling such eccentric position only during initial start-up of the device.

10. A variable displacement hydraulic device comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; cylindrical piston reaction ring means immersed in fluid within said casing and being continuously and progressively eccentrically adjustable relative to said cylinder block to vary the displacement of the hydraulic device; means mounting said reaction ring means for rolling translational movement while sealing said reaction ring means from said casing on opposite sides of the reaction ring means; and means for applying a fluid pressure differential across said reaction ring means to vary the eccentricity of said reaction ring means relative to said cylinder block assembly so as to vary the piston stroke.

References Cited in the file of this patent

UNITED STATES PATENTS

| | | |
|---|---|---|
| 1,974,961 | Johnson | Sept. 25, 1934 |
| 2,433,484 | Roth | Dec. 30, 1947 |
| 2,509,256 | Sorensen | May 30, 1950 |
| 2,566,418 | Horton | Sept. 4, 1951 |
| 2,635,551 | De Lancey | Apr. 21, 1953 |
| 2,673,526 | Horton | Mar. 30, 1954 |
| 2,680,412 | Entwistle | June 8, 1954 |
| 2,702,044 | Johnston | Feb. 15, 1955 |
| 2,724,339 | O'Connor et al. | Nov. 22, 1955 |
| 2,855,858 | Larsen et al. | Oct. 14, 1958 |
| 2,875,699 | Herndon | Mar. 3, 1959 |

FOREIGN PATENTS

| | | |
|---|---|---|
| 537,616 | Italy | Jan. 2, 1956 |